(12) United States Patent
Bugno

(10) Patent No.: US 11,635,259 B2
(45) Date of Patent: Apr. 25, 2023

(54) MACHINE FOR CLEANING FURNACE REGENERATION CHAMBERS FOR THE PRODUCTION OF GLASSWARE

(71) Applicant: FARE S.R.L., Dolo (IT)

(72) Inventor: Riccardo Bugno, Dolo (IT)

(73) Assignee: FARE S.R.L., Dolo (IT)

( * ) Notice: Subject to any disclaimer, the term of this patent is extended or adjusted under 35 U.S.C. 154(b) by 76 days.

(21) Appl. No.: 17/429,070

(22) PCT Filed: Mar. 6, 2020

(86) PCT No.: PCT/IB2020/051968
§ 371 (c)(1),
(2) Date: Aug. 6, 2021

(87) PCT Pub. No.: WO2020/183323
PCT Pub. Date: Sep. 17, 2020

(65) Prior Publication Data
US 2022/0049901 A1 Feb. 17, 2022

(30) Foreign Application Priority Data

Mar. 8, 2019 (IT) .................. 102019000003401

(51) Int. Cl.
*B08B 9/032* (2006.01)
*B08B 5/04* (2006.01)
(Continued)

(52) U.S. Cl.
CPC .......... *F27D 25/008* (2013.01); *B02C 21/026* (2013.01); *B08B 5/04* (2013.01); *B08B 9/0325* (2013.01); *B08B 9/0328* (2013.01); *B08B 13/00* (2013.01); *G05D 1/0038* (2013.01); *B02C 2021/023* (2013.01); *B08B 2209/032* (2013.01); *C03B 5/237* (2013.01); *F27D 2017/007* (2013.01); *G05D 2201/0203* (2013.01)

(58) Field of Classification Search
CPC ............ F27D 25/008; F27D 2017/007; B02C 21/026; B02C 2021/023; B08B 5/04;
(Continued)

(56) References Cited

U.S. PATENT DOCUMENTS 9,061,326 B2 * 6/2015 Eriksson ................. B24C 3/325
9,604,263 B2 * 3/2017 Eriksson ................. B08B 9/08
(Continued)

FOREIGN PATENT DOCUMENTS

CN 104998850 A * 10/2015 ............ B08B 13/00
CN 105014674 A * 11/2015
(Continued)

*Primary Examiner* — Alexander Markoff
(74) *Attorney, Agent, or Firm* — Carmel Patent Agency; Robert Ballarini

(57) ABSTRACT

A machine for cleaning regeneration chambers of furnaces, the regeneration chambers having stacks of hollow refractory elements delimiting vertical passages, which define chimneys includes a self-propelled support structure to be introduced into a compartment, below the regeneration chamber to be cleaned, which communicates with the regeneration chamber. The machine further includes at least one lance, applied to the self-propelled support structure and configured to send within the vertical passages a stream of cleaning material powder and compressed air generated by a compressor positioned outside of the regeneration chamber to be cleaned, and at least one suction mouth, applied to said support structure and configured to suck cleaning material dust and aspirable materials from the ground, which were removed during the cleaning operation. At least one video camera is mounted on the support structure and at least one monitor controls from outside, through the video camera, operation of the machine.

21 Claims, 7 Drawing Sheets

(51) Int. Cl.
*B08B 13/00* (2006.01)
*F27D 25/00* (2010.01)
*B02C 21/02* (2006.01)
*G05D 1/00* (2006.01)
*C03B 5/237* (2006.01)
*F27D 17/00* (2006.01)

(58) Field of Classification Search
CPC ..... B08B 9/0325; B08B 9/0328; B08B 13/00; B08B 2209/032; G05D 1/0038; G05D 2201/0203; C03B 5/237
See application file for complete search history.

(56) References Cited

U.S. PATENT DOCUMENTS

| | | | | |
|---|---|---|---|---|
| 10,112,283 B2 * | 10/2018 | Bugno | ...................... | B24C 1/00 |
| 10,174,564 B1 * | 1/2019 | Carter | ...................... | E21B 37/00 |
| 2015/0211403 A1 * | 7/2015 | Brunello | ............... | F01N 3/0237 |
| | | | | 134/21 |
| 2015/0314419 A1 * | 11/2015 | Bugno | ...................... | B24C 1/00 |
| | | | | 134/7 |
| 2019/0084013 A1 * | 3/2019 | Mitsue | .................... | B08B 9/021 |
| 2020/0139555 A1 * | 5/2020 | Paterni | ................. | B25J 11/0085 |
| 2022/0049901 A1 * | 2/2022 | Bugno | .................. | F27D 25/008 |

FOREIGN PATENT DOCUMENTS

| | | | | |
|---|---|---|---|---|
| CN | 106150693 B | * | 9/2018 | |
| DE | 202015009521 U1 | * | 3/2018 | |
| ES | 2237326 A1 | | 7/2005 | |
| JP | 3290582 B2 | | 6/2002 | |
| WO | WO-9639277 A2 | * | 12/1996 | ............ A62C 27/00 |
| WO | 2014060322 A1 | | 4/2014 | |
| WO | WO-2014060322 A1 | * | 4/2014 | ............ B08B 9/093 |
| WO | 2018224969 A1 | | 12/2018 | |
| WO | WO-2018224969 A1 | * | 12/2018 | ............... B08B 5/02 |
| WO | WO-2019204856 A1 | * | 10/2019 | ............ B08B 13/00 |
| WO | WO-2020183323 A1 | * | 9/2020 | ........... B02C 21/026 |

\* cited by examiner

MACHINE FOR CLEANING FURNACE REGENERATION CHAMBERS FOR THE PRODUCTION OF GLASSWARE

INVENTIVE FIELD

The present invention relates to a machine for cleaning furnace regeneration chambers, particularly for the production of glass articles.

BACKGROUND

The current production technique for glassware involves the use of furnaces with hot air regeneration chambers used for preheating the combustion gases and for maintaining the temperature and, in general, to promote energy savings.

The operation of a traditional regeneration chamber requires that the fumes from the furnace are conveyed inside the regeneration chamber containing layers of refractory materials generally presenting a perforated or alveolar structure, stacked on each other. The fumes are passed between these layers, which, in contact with the bricks, heat them, and make the regeneration chamber perform the function of heat reservoir.

In this step the fumes cool down from 1200-1300° C. up to about 400° C. and are then recovered and returned to the furnace or to the exhausts. During this step the fumes release soot and other volatile products from the melting of the glass.

The layers of refractory materials are made of perforated bricks arranged in a staggered manner in order to create stacking vessels, which in practice consist of vertical paths (chimneys), along which the fumes can pass and as they pass they deposit on the walls soot, sulfates and other products which over time can also cause obstruction of the vertical path. It is therefore necessary to periodically clean these chimneys and that is to remove the soot and other volatile products from the melting of the glass.

A known method for cleaning the regeneration chambers is described in WO 2014/060322, which must be considered incorporated by reference here. It provides that operators introduce into the chimneys of the regeneration chamber, through access openings provided in compartments below and above the regeneration chamber itself, lances delivering a flow of compressed air and quartz dust, which in this way cleans the chimney themselves.

This method has proved satisfactory, since it has allowed obtaining an effective cleaning of the regeneration chamber, but at the same time it has proved to be improved following the elimination of certain limitations found in it.

A first limitation is linked to the uncomfortable working conditions for operators who work in the upper part of the regeneration chamber, where temperatures can even reach 100° C.

Another limitation is linked to the limited spaces available for operators, who must be able to handle lances of considerable length within confined spaces.

Another limitation is linked to the fact that the openings of the access to the lower compartment and to the upper compartment of the chamber to be cleaned cause an escape of hot air, and therefore a drop in temperatures, and also cause an excess of oxygen in the combustion mixture due to the entry of the atmospheric air inside the furnace, with the need to recalibrate the relative parameters to allow the maintenance of the optimal operating conditions of the furnace itself.

Another limitation is linked to the fact that cooling the regeneration chamber also involves cooling the furnace, with consequent production problems, unless the power of the heating system and consequently installation and operating costs, are increased. exercise. This drawback could be avoided if the work periods were interspersed with breaks with closed doors to bring the optimum temperature back into the furnace, but this would entail a reduction in the production potential of the furnace, which does not work during these breaks.

Another limitation is linked to the fact that on the one hand the lances should be long enough to be able to reach even the innermost sections of the chimneys and on the other hand they should be short enough not to be in the way of their introduction into the passages vertical to be cleaned, especially in the case of access rooms with limited vertical development.

SUMMARY

The object of the invention is to propose an improved machine which is suitable for cleaning furnace regeneration chambers, in particular for the production of glass articles, but which does not present all these limitations. In particular, the object of the invention is to propose an improved machine for cleaning narrow spaces with vertical development of the regeneration chambers.

Another object of the invention is to propose a machine that allows to clean these narrow spaces in an automated way or in any case to replace the human operator.

Another object of the invention is to propose a machine that allows cleaning vertical spaces without the need for bulky connections with the outside.

Another object of the invention is to propose a machine which allows to work continuously over 24 hours.

Another object of the invention is to propose a method for cleaning the chimneys which allows to verify the conditions of the chamber, and to diagnose any malfunctions and/or criticalities relating thereto.

All these aims and others which will result from the following description are achieved, according to the invention, with a machine for cleaning furnace regeneration chambers, in particular for the production of glass articles, and with a method for cleaning furnace regeneration chambers for the production of glass articles as defined in the appended independent claims.

BRIEF DESCRIPTION OF THE DRAWINGS

The present invention is further clarified below in some of its preferred forms of practical embodiment, given purely by way of non-limiting example, with reference to the attached drawings, where.

DETAILED DESCRIPTION OF THE PREFERRED EMBODIMENTS

Figure 1:
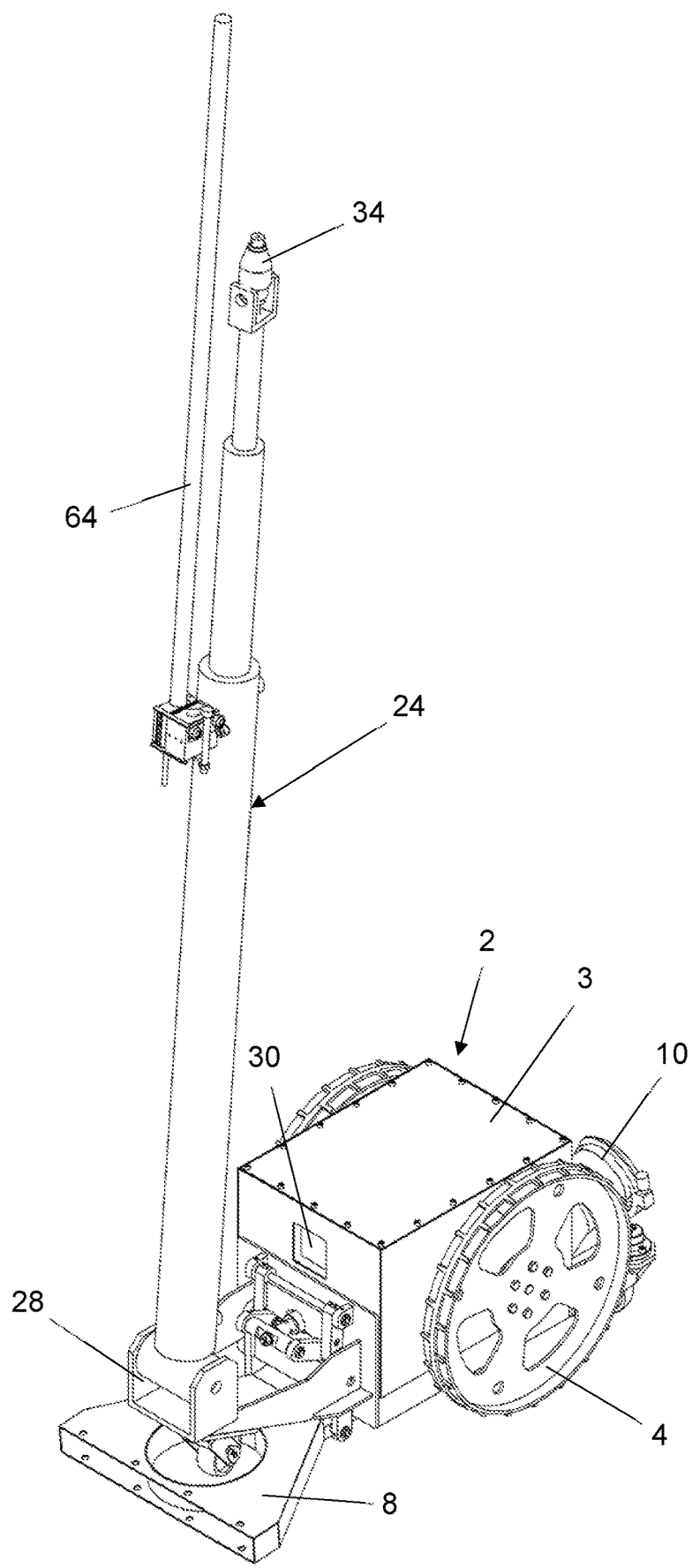
FIG. 1 shows a perspective view of a machine according to the invention.

As can be seen from the figures, the cleaning machine 2 according to the invention—for the cleaning of regeneration chambers 56 of furnaces for the production of glass articles, with the stacking of hollow refractory elements delimiting vertical passages (chimneys) for the combustion fumes coming from said furnaces—comprises a self-propelled support structure with a body 3 and with movement members associated with a drive motor.

Conveniently, said movement members comprise at least two motorized wheels 4, associated with respective motors for their independent movement. These motors could be of any type, although pneumatic motors are preferable, given that the machine already uses compressed air for its normal operation, as will be better seen later. Alternatively, the motors can be of the hydraulic type.

Advantageously, in addition to the two motorized wheels 4, two idle wheels 6 of the adjustable type are also applied to the body 3 of the machine 2, which ensure the stability of the support on the surface along which the machine must be moved, and at the same time allow it easy maneuverability, as they can also rotate around a vertical axis.

Conveniently, in another embodiment, the movement members comprise one or more tracks 4'.

Suitably, the body 3 is positioned between the moving members, which can be defined by the wheels 4 and/or small wheels 6, or by the tracks 4'.

The body 3 of the machine 2 is made with two box-shaped casings 3', 3", one internal 3' and one external 3", of which at least the external one has an overall parallelepiped shape. Conveniently, the two casings 3' and 3" delimit a cavity 5 between them, which allows to keep the temperature of the internal part (and in particular of the content of the internal casing 3') of the body 3 which houses the command and control elements of the functionality of the machine itself low with respect to the external part, which during work can reach higher temperatures.

Preferably, the cavity 5 can have a volume comparable with that of the internal casing 3', in order to house a substantial amount of air. Conveniently, the internal casing 3' and the external casing 3" can be made integral with each other by a plurality of supports 7, which can for example have a lamellar shape and which define an air path 9, as will be clear below, in order to allow the circulation of the air inside the cavity 5, avoiding or at least limiting the risk of localized heating.

The machine 2 according to the invention also includes a suction apparatus, with a front suction mouth 8, which communicates posteriorly with a sleeve 10 for attachment of a suction duct 12, in turn connected to an external suction unit 14, preferably with the interposition of a bagging filter 16 of the solid products obtained during the cleaning of the machine.

One or more actuators (not shown in the drawings), preferably of the pneumatic type, can be advantageously associated with the suction mouth 8, which can cause vertical movements of raising and lowering the mouth itself and/or lateral movements with respect to the body 3.

In position above the coupling sleeve 10 for the suction duct 12, a second sleeve 18 for attachment of a compressed air supply duct 20 is provided in the body of the machine.

More in detail, inside this duct 20, which more properly can be defined as a sheath, are housed a plurality of electric cables and a plurality of pneumatic ducts, which carry different compressed air flows inside the machine 2, to carry out, multiple functions as will be better shown below.

The operation of the machine 2 is managed by a group of valves housed inside the body 3 of the machine itself and pneumatically controlled through an external control console 22. Alternatively the valves that manage the operation of the machine 2 can be controlled remotely by remote controls which can operate on radio frequencies, for example through WPAN technologies such as Bluetooth, or via WLAN technologies.

More specifically, there is a control valve for the flow of compressed air and quartz powder, an air flow control valve that supplies the pneumatic motors for driving the two drive wheels 4, air flow control valves that supply the actuators for moving the suction mouth 8, and other air flow control valves which carry out the movement of one or more cleaning lances 24, as will be better described below.

As has been said, these valves are controlled by the control console 22 with suitable levers 26 provided therein, through pneumatic ducts which connect the console itself to the body 3 of the machine and which partly run inside the sheath 20.

In the present description reference will only be made to control levers 26, but they could advantageously be replaced by buttons or other control elements such as joysticks or the like.

As already mentioned, a cleaning lance 24 is mounted on the body 3 of the machine 2, by means of which the machine can send a flow of compressed air and quartz dust on the surface to be cleaned and more specifically on the internal surface of the chimneys.

In the illustrated example, the machine 2 is equipped with a single lance 24, but the invention provides that the machine can be equipped with several lances, preferably operated independently of each other.

Each lance 24 is advantageously of the telescopic type and is constrained to the body 3 of the machine 2 through a support 28, which allows the lance itself to be rotated both around a vertical axis and around a horizontal axis, so that it can be however oriented in space.

The various movements of the lance 24, i.e. both the rotation movements around the vertical axis and the rotation movements around the horizontal axis and the extension and telescopic shortening movements, are advantageously obtained with suitable pneumatic actuators, supplied with air compressed and controlled by means of corresponding levers 26, which the control console 22 is equipped with.

One or more cameras are also advantageously applied to the body 3 of the machine 2, for example: a front camera 30 and a rear camera 32, capable of taking images of a large area in front of and behind the working area of the machine; a third video camera 34 is advantageously mounted at the upper end of the lance 24 and is able to capture the internal areas of the chimneys, within which the lance 24 is introduced during the cleaning work. The latter camera 34 can be integral with the lance itself and can therefore be oriented following its movements, or it can be mounted on its own support which allows it to move with respect to the lance 24. Advantageously, the cameras 30, 32 can be inserted into the inside the body 3 of the machine 2, and preferably inside the cavity 5, so as to be protected from falling debris and high temperatures which could damage the electronics. The sheath 20, which has one end connected with the sleeve 18 provided in the body of the machine 2, has the other end connected with a multiple fitting 36, which also includes a second sheath 38 for connection to the console 22, a first duct 40 for supplying compressed air and cleaning quartz powder and a second duct 42 for supplying cooling compressed air.

The sheath 20, which connects the machine 2 to the console 22 through the multiple fitting 36 and the sheath 38, houses, as mentioned above, a plurality of pneumatic ducts and a plurality of electrical cables. The pneumatic ducts supply the machine 2 with the compressed air generated by a first compressor 44, which is connected to the console itself through a third duct 46, so that the compressed air can feed the valve group contained within the body of the machine 2 and, on the basis of the commands given through the levers 26 of the console 22, it can feed in a controlled manner the corresponding actuators mounted on the machine itself for the movement of the wheels 4 and of the other organs, of which the machine itself is equipped to perform the various functions.

The electric cables connect to the console 22 the electronic equipment installed on the machine, and in particular the cameras 30, 32, 34 and the sensors of various types.

The first duct 40 feeds to the multiple fitting 36, and from there to the machine 2, a flow of compressed air and quartz dust. The compressed air is generated by a second compressor 50 and is sent to a tank 52, from which the flow itself takes the dosed quantity of quartz powder, to send it, through the sheath 20 to the lance 24. Preferably the quartz powder has a grain size between 0.9 and 2.1 mm.

The multiple fitting 36 also reaches, through the second duct 42, a compressed air flow generated by a third compressor 54 and introduced into the space delimited externally by the sheath 20 and internally by the pneumatic ducts and electrical cables placed inside it, for the purpose cooling said ducts and cables which, given their proximity to the regeneration chamber 56 to be cleaned, are located in part within a high temperature environment. Conveniently, the air flow generated by said third compressor 54 can also reach the cavity 5 through the second duct 42 in order to cool the inside of the machine.

Advantageously to the body 3 of the machine 2, and preferably in a higher position with respect to the body itself, can be associated a container 45 connected to the compressed air supply circuit, for example with the second duct 42 for supplying the cooling compressed air generated by the third compressor 54. Advantageously, said container 45 comprises a plurality of nozzles 46 directed towards the body 3 of the machine 2 which allow the compressed air present inside it to escape. Suitably in this way it is possible to create a flow of compressed air which allows to efficiently cool and/or clean the external casing of the machine 2 and/or the cameras 30, 32. Conveniently the container 45 can comprise a safety valve 47 which can be activated in case the pressure inside it exceeds a predefined value in order to prevent its explosion. Advantageously, moreover, the container can provide a further valve 48, preferably positioned in its lower part, to allow the discharge of any condensate that may have formed inside it.

The operation of the machine according to the invention provides that it is moved via the console 22 until it enters the lower compartment 55 of the regeneration chamber 56 to be cleaned, so that, after closing the access doors 58, it remains connected to the external only by means of the sheath 20 and the suction duct 12. From the outside the operator can control, also through the console 22, the various operating and transfer movements of the machine 2 inside the compartment 55 and, it can also control, through a monitor 60, with which the console itself is provided, the correct movements and the correct operation of the cleaning machine. To this end, it can advantageously be provided that this monitor 60 has different areas, in which images taken by the various cameras 30, 32, 34 can be displayed simultaneously, or a single area, in which images taken by one or more can be selectively displayed. on the other camera.

Figure 2:
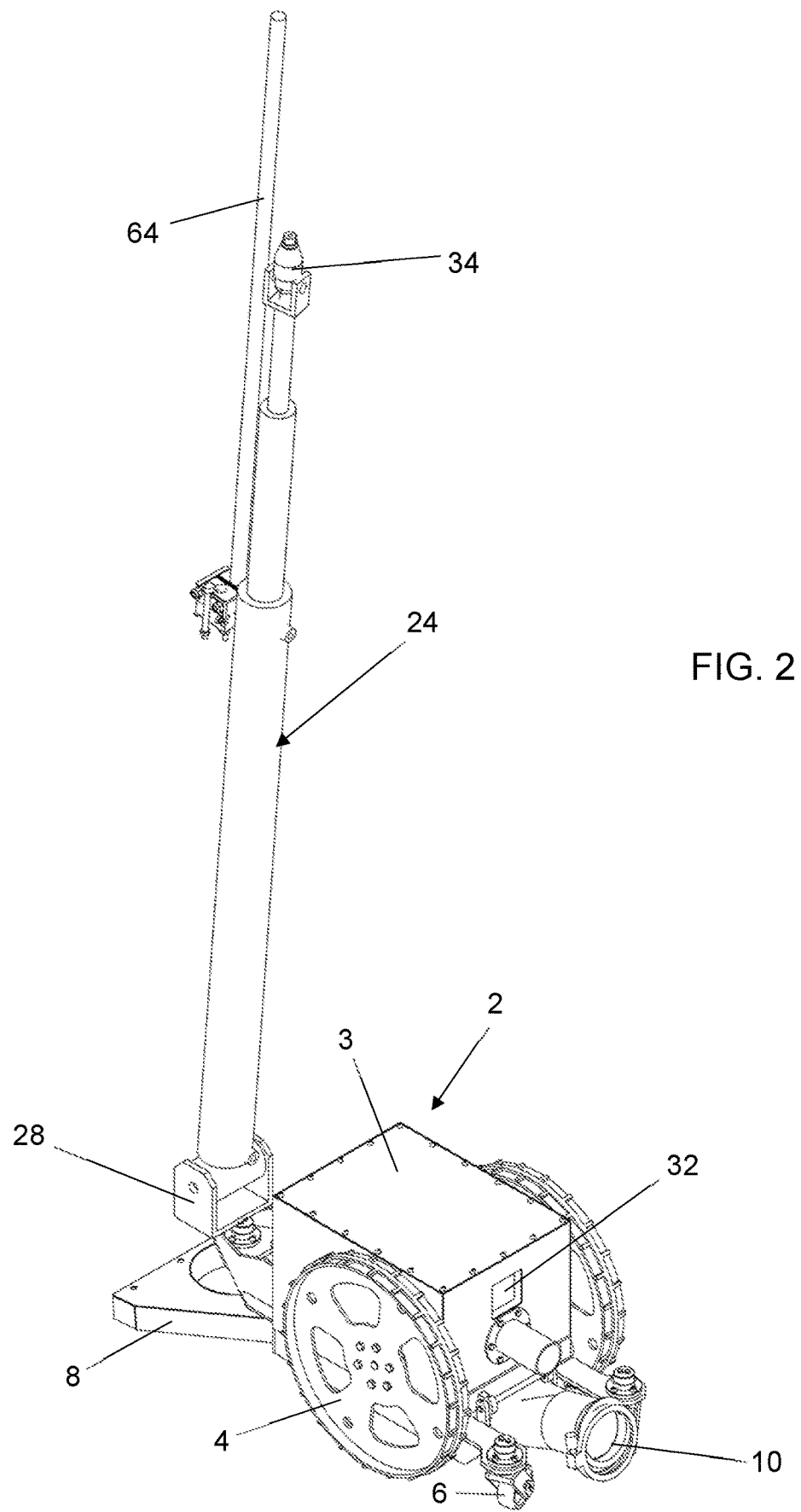
FIG. 2 shows it in a rear perspective view.
Figure 3:
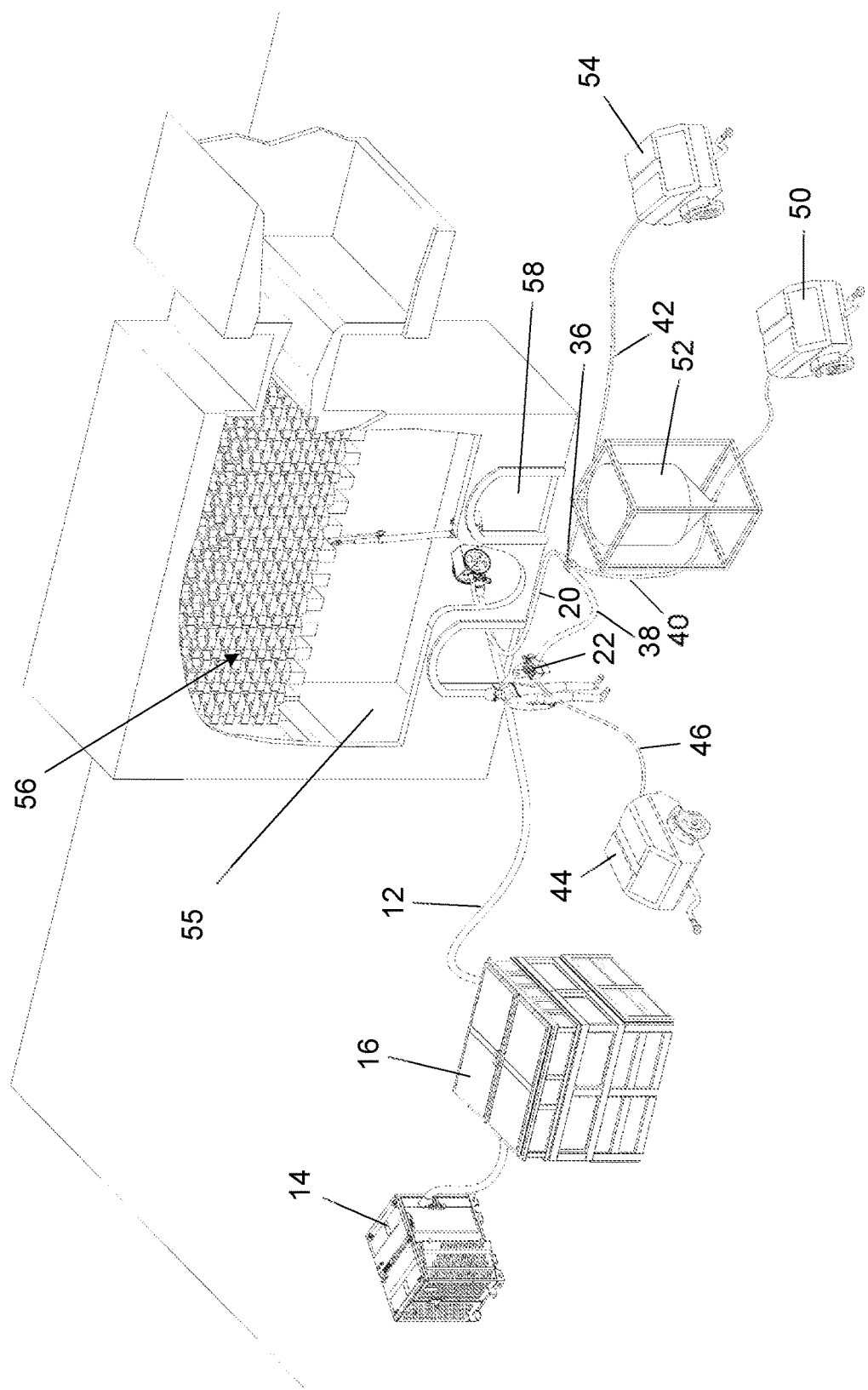
FIG. 3 shows it schematically inserted in a usual operating environment.
Figure 4:
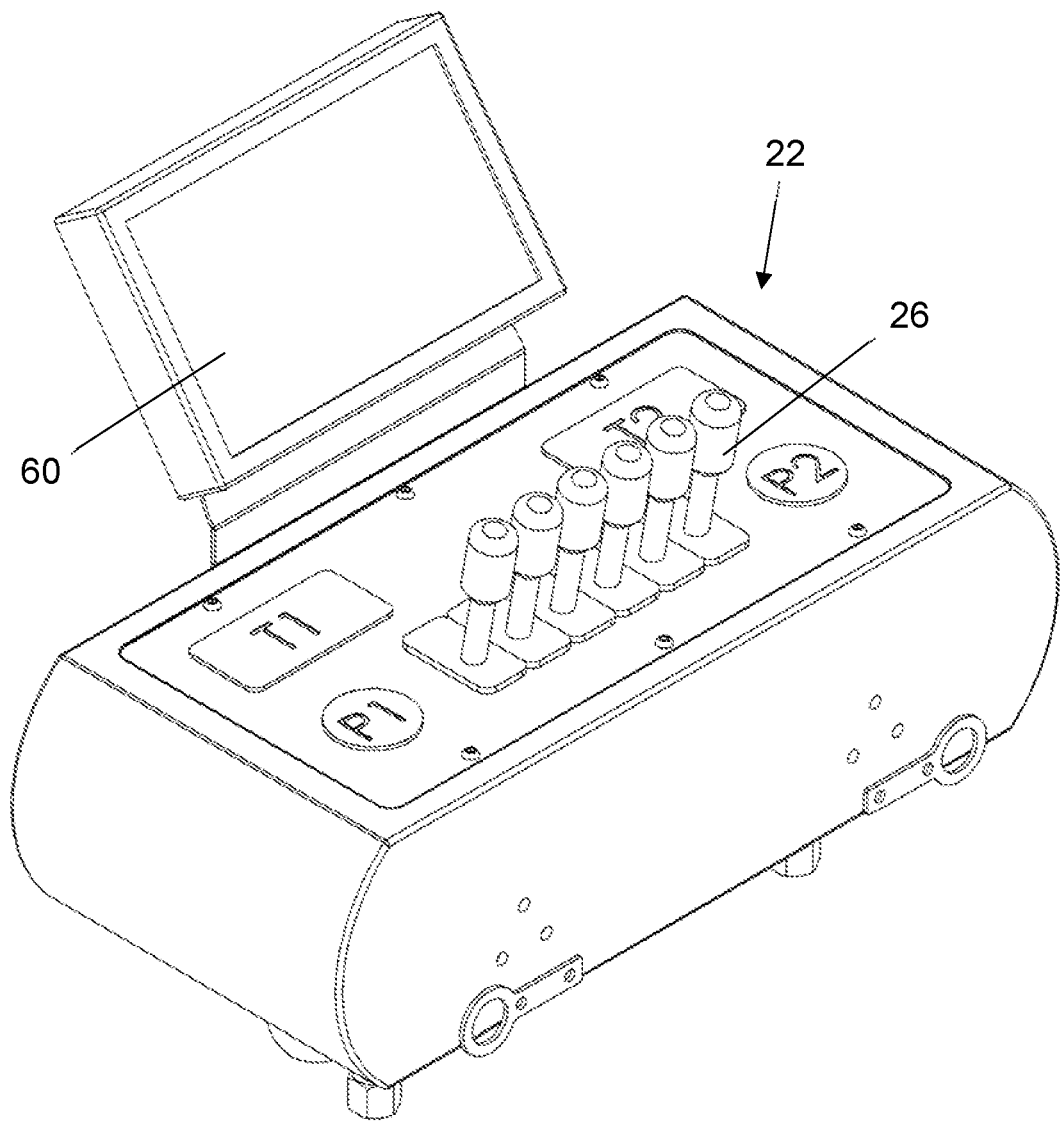
FIG. 4 shows a perspective view of its control console.

The lance 24 is also provided with sensors which have the function of ensuring the centering of the lance with respect to the chimneys of the regeneration chamber 56, in which it must be inserted in order to perform its cleaning function. In FIGS. 1 and 2, a laser sensor 64 is applied to the lance 24 as an example.

For practical reasons, the console 22 is provided with a pair of shoulder straps 62 for its easy shoulder support by the operator.

Figure 5:
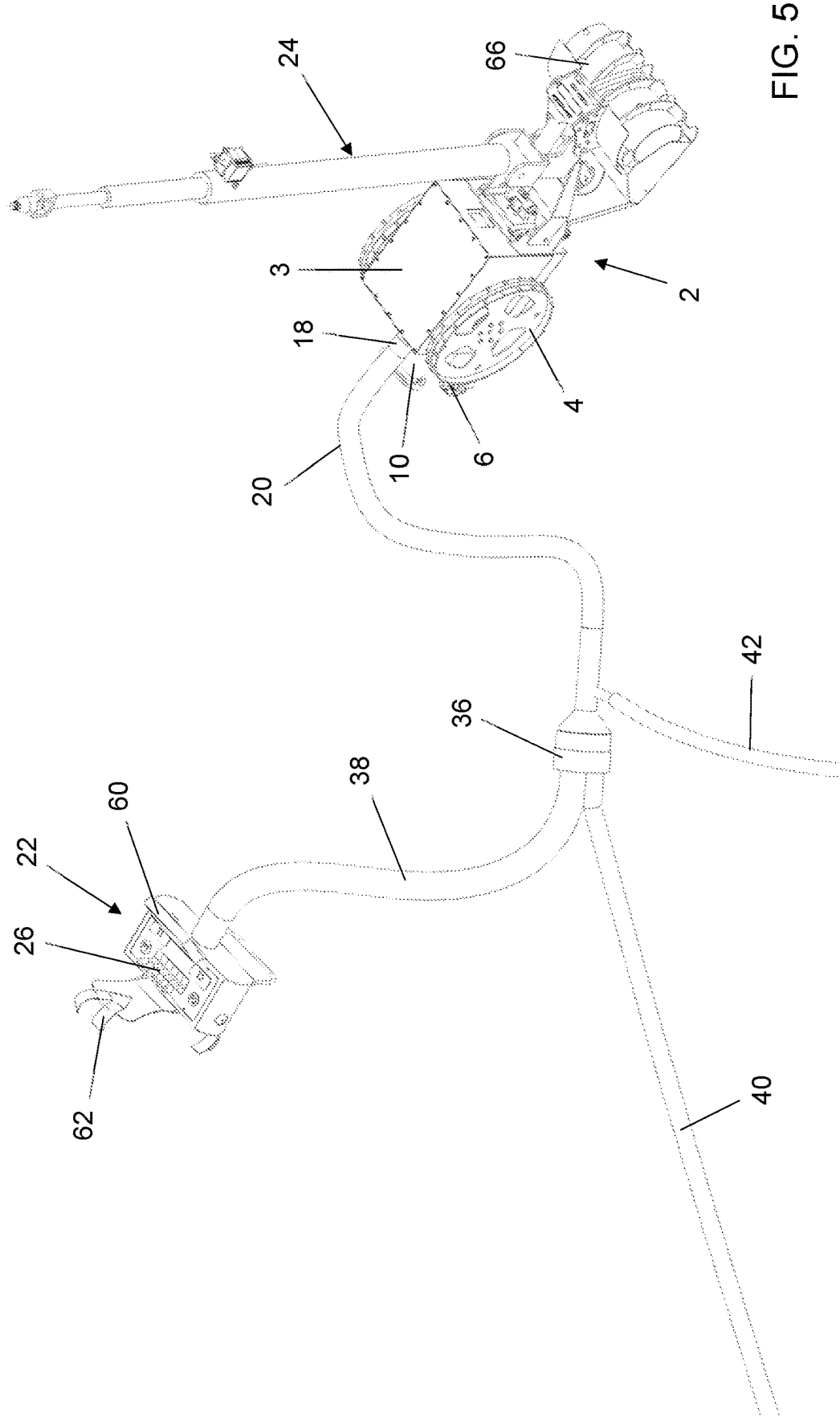
FIG. 5 shows it in a perspective view on the top in a particular set-up with a front crusher, connected, through electrical and/or pneumatic ducts, with its control console and with external compressed air generators.
Figure 6:
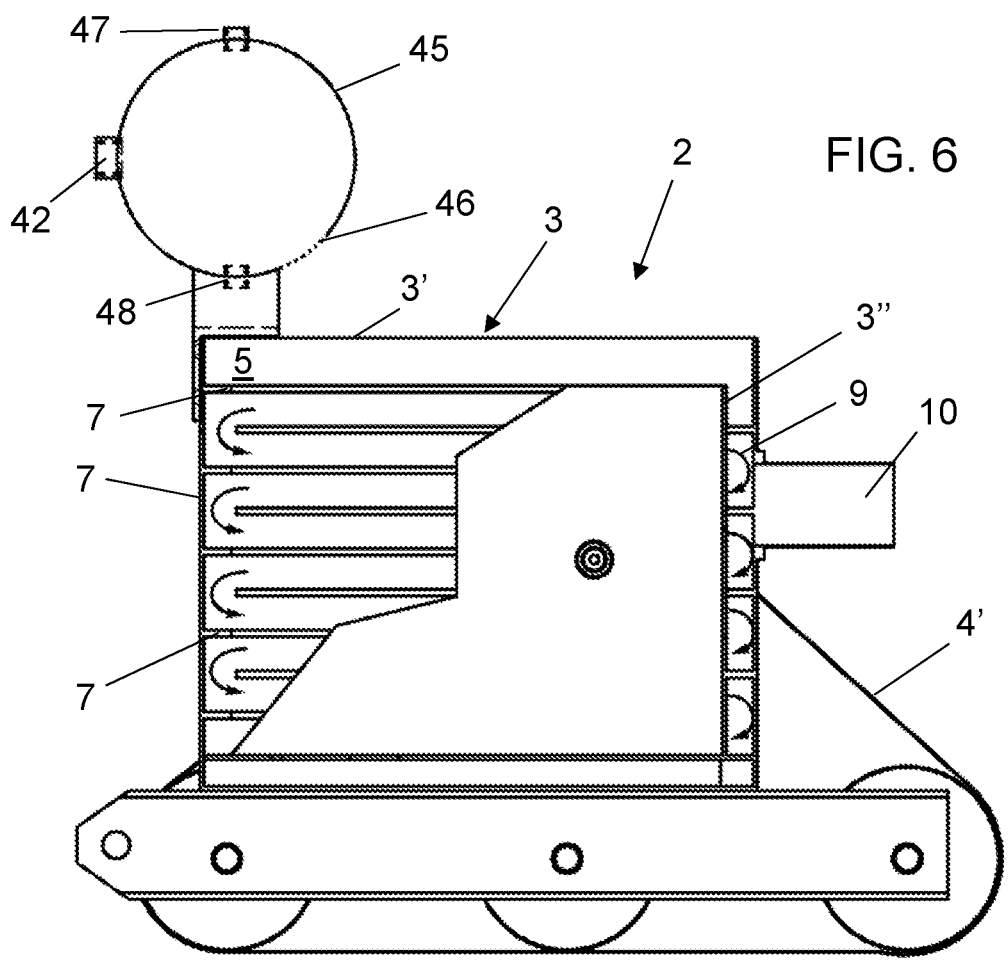
FIG. 6 shows a side section of a further embodiment of the machine according to invention.
Figure 7:
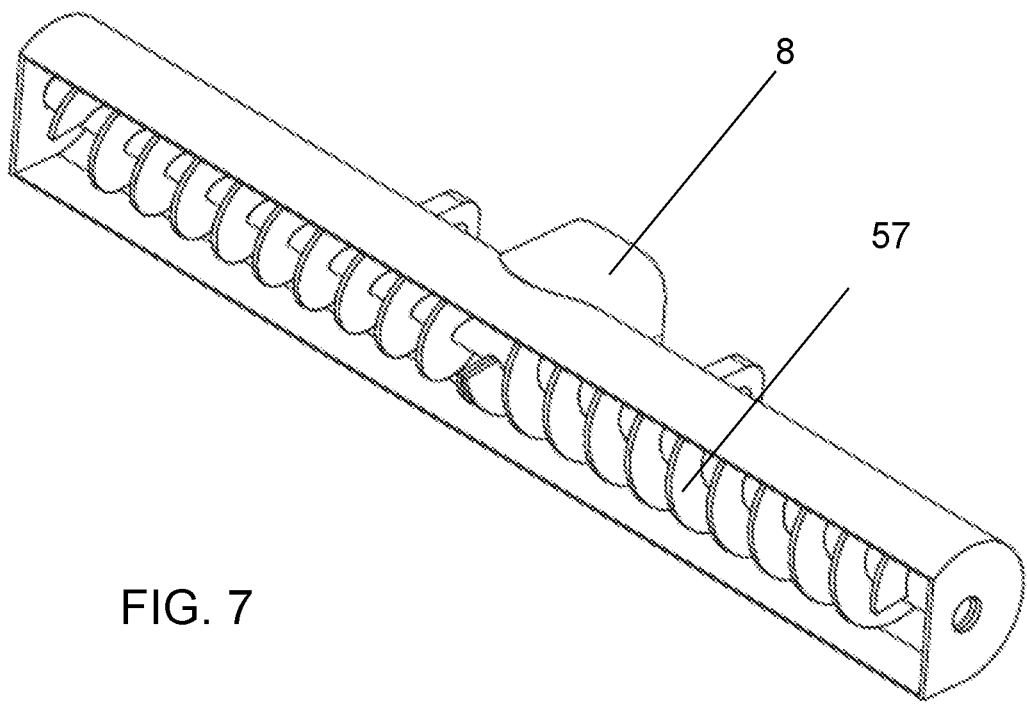
FIG. 7 shows a perspective view of a detail of the machine head in a first embodiment.
Figure 8A:
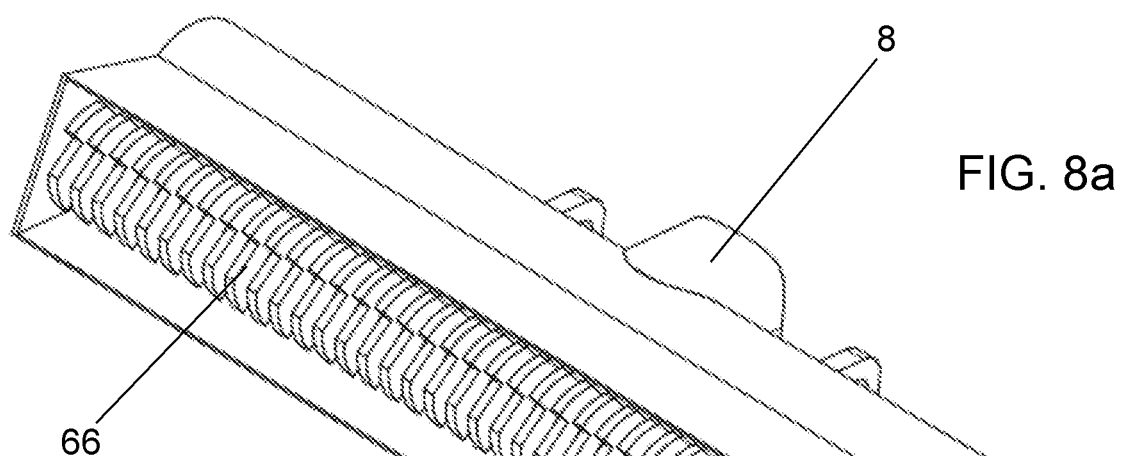
FIG. 8a shows a perspective view of a detail of the machine head in a further embodiment.
Figure 8B:
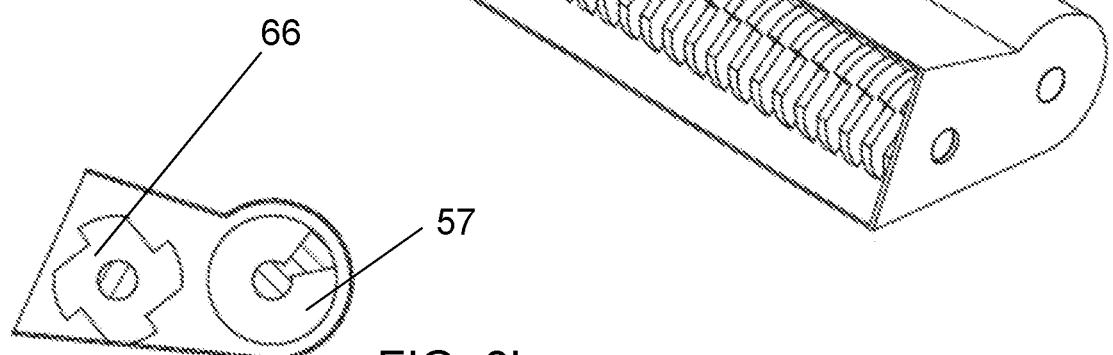
FIG. 8b shows it in side section.
Figure 9:
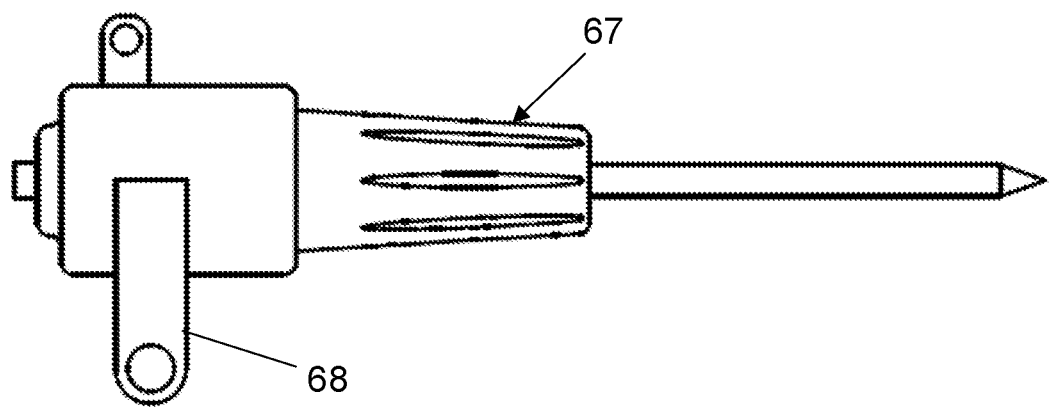
FIG. 9 shows the pneumatic hammer which can be fixed to the machine head.

In an advantageous embodiment, the cleaning machine according to the invention, shown in FIG. 5, also includes in its front part a crusher 66 of the larger solid parts, which otherwise could not be removed from the suction mouth 8. It is preferably of type comprising a rotating member equipped with blades or protrusions made of hard material, suitable for crushing any larger solid residues that have fallen from the chimneys during the cleaning work, and reducing them to dimensions suitable for their aspiration by the suction mouth 8. Also this crusher 66 can be equipped for its movements with a preferably pneumatic motor, controllable by the operator through a specific lever 26 mounted on the console 22.

For the removal of larger bodies, unsuitable to be crushed, the machine 2 can also comprise a lift device configured to lift and transfer to the outside of the regeneration chamber 56 those larger bodies which cannot be crushed and aspirated by the mouth 8. Preferably, said lifting device consists of a traditional lifting blade (not shown in the drawings), which is operated by its own actuator, also controllable by the operator through the console 22.

Advantageously, in a further embodiment at the front of the machine 2, and preferably between the crusher 66 and the suction mouth 8, an cochlea 57 can be positioned, preferably with rotation axis perpendicular to the forward direction of the machine 2, configured to convey the debris from the periphery to the suction mouth 8. The cochlea 57 can suitably be equipped with suitable brushes, in order to be able to convey even the smallest debris.

Advantageously, in a further embodiment, a pneumatic hammer 67 can be positioned at the front of the machine 2, and preferably in front of or in place of the crusher 66, associated with the machine 2 by means of one or more supports 68. Preferably said pneumatic hammer 67 it can be swiveled to allow even large blocks to be reached and crushed. Preferably also said pneumatic hammer 67 can be supplied by means of the compressed air supply circuit.

Once the machine has been brought into the lower compartment 55 of the regeneration chamber 56, the operator, acting on the levers 26 of the console 22, moves it, keeping the telescopic lance 24 in this phase in a vertical or preferably horizontal condition, and retracted, and at the same time controls the movements themselves through the monitor 60 of the console 22. Advantageously, before starting the cleaning of the chimneys, a complete cleaning of the lower compartment 55 of the regeneration chamber 56 can be carried out, in order to detect the type of residues present on the floor and their location. This allows to diagnose any weaknesses of the structure in order to prevent collapses or breakages, and also to verify the efficiency of the entire glass melting process.

Subsequently, the operator acts on the levers 26 of the console 22 to position the machine below the lower end of a chimney to be cleaned.

Once the lance 24 is positioned below this chimney, the operator, always checking the correctness of the movements on the monitor 60, causes the telescopic lengthening of the lance 24 until it has entered the chimney and has gone up with its operational head along the chimney itself. In this phase, the presence at the end of the lance 24 of the laser sensor 64, which has the function of centering the lance with respect to the chimney and possibly automatically causing those small adjustment movements of the machine 2 to ensure such centering during the lengthening of the lance inside the chimney itself.

Subsequently, the operator, always acting appropriately on the levers 26 of the console 22, activates the lance 24, regulating the flow of compressed air and quartz dust according to the particular nature of the work to be carried out, and at the same time causes the telescopic movement of the lance 24 along the chimney, in which it was introduced, to carry out its complete cleaning.

In this phase, the quartz powder, mixed with the carbon residues removed from the inner surface of the fireplace, falls onto the floor of the chamber 56 and can be removed from the suction mouth 8.

When the furnace has been completely cleaned, the lance is retracted and the machine is moved to repeat the operation on another chimney.

The removal of quartz dust and carbon residues can take place at the end of the cleaning of each chimney or after this cleaning has been carried out for a certain number of chimneys.

Another characteristic of interest consists in the fact that both the internal box-like casing and the external box-like casing of the body 3 of the machine 2 can advantageously be provided with sensors that detect the temperature of the two casings: they are not used during the operation of the machine, but in the process of developing it before its use. More specifically, depending on the environmental conditions in which the machine operates, if they are such as to bring the temperature values of the two internal and external enclosures outside the preset values for example +50° C. for the internal enclosure and +70° C. for the outer casing), the operator can open more or less the discharge ports provided in the body 3 of the machine 2, for the compressed cooling air, which comes from the second duct 42, and therefore can decrease or increase the flow of this which enters the body of the machine, so as to ensure the optimum temperature of the various parts at full capacity.

In a different embodiment, not shown in the drawings, it is provided that the lance 24 is not of the extendable type, but that the jet of compressed air and quartz dust is such as to be able to reach even the upper parts of the chimneys.

Furthermore, it is also provided that the machine is equipped with an automatic guiding system which allows it to be moved within the lower compartment 55 of the regeneration chamber 56 without the need for continuous operator assistance.

From what has been said it is clear that the machine according to the invention fully achieves the stated aims, and in particular:

allows operators to stay away from the areas of the regeneration chamber at high temperatures and therefore to work in uncomfortable conditions, does not require to operators to make laborious maneuvers to move the lance, allows the compartment below the regeneration chamber to be kept substantially closed, preventing the escape of hot air and eliminating the negative consequences that this entails, does not entail any cooling of the furnace, which can always work with high efficiency and low installation and operating costs, allows the complete cleaning of the regeneration chamber regardless of the linear development of the chimneys, allows the furnace to operate continuously over 24 hours, allows to operate, automatically if suitably programmed.

In particular, the machine according to the invention is advantageous compared to the method described in WO 2014/060322 in that it allows workers to remain outside the chamber to be cleaned, thus avoiding exposure to high temperatures and to dust and rubble to be cleaned up.

The invention claimed is:

1. Machine (2) for cleaning regeneration chambers (56) of furnaces, for the production of glass articles, the regeneration chambers (56) having stacks of hollow refractory elements delimiting vertical passages, which define chimneys for combustion fumes from said furnaces, the machine comprising:

a self-propelled support structure to be introduced into a compartment (55), which is below a regeneration chamber (56) to be cleaned and which communicates with said regeneration chamber (56) to be cleaned, at least one lance (24), applied to said self-propelled support structure and configured to send within said vertical passages a stream of cleaning material powder and compressed air, at least one suction mouth (8), applied to said support structure and configured to suck cleaning material dust and aspirable materials from a floor of the compartment (55), which were removed from the regeneration chamber (56) during cleaning, at least one video camera (30, 32, 34) mounted on said self-propelled support structure, and at least one monitor (60) controlling from outside of the regeneration chamber (56) to be cleaned, through said at least one video camera (30, 32, 34), operation of said machine.

2. The machine according to claim 1 wherein said self-propelled support structure comprises movement members (4, 4') and at least one motor for driving said movement members (4, 4').

3. The machine according to claim 2, wherein said movement members are made up of wheels (4).

4. The machine according to claim 2, wherein said movement members are constituted by tracks (4').

5. The machine according to claim 2, wherein said motor is of the pneumatic or hydraulic type.

6. The machine according to claim 1, wherein said lance (24) is of the telescopic type.

7. The machine according to claim 1, further comprising an orientable support (28), wherein said lance (24) is supported by the orientable support (28), and is controlled remotely.

8. The machine according to claim 1, further comprising a crusher (66).

9. The machine according to claim 8, further comprising a lifting device configured to lift and transfer outside the regeneration chamber (56) larger bodies which cannot be crushed by the crusher (66) and sucked by the suction mouth (8).

10. The machine according to claim 1, further comprising a control console (22) configured to control the machine from outside of said compartment (55), the machine being located inside said compartment (55).

11. The machine according to claim 10, further comprising a plurality of pneumatic actuators for movement of operating parts of the machine.

12. The machine according to claim 11, wherein said control console (22) is connected to said pneumatic actuators by means of pneumatic ducts for controlled supply of compressed air destined for the operation of said actuators.

13. The machine according to claim 1, wherein said lance (24) is provided with at least one laser sensor (64) for detecting its position.

14. The machine according to claim 10, further comprising a sheath (20) housing electrical and pneumatic ducts, said ducts connecting said console (22) with said self-propelled support structure.

15. The machine according to claim 2, wherein said self-propelled support structure comprises a body (3) interposed between the movement members (4, 4').

16. The machine according to claim 15, wherein said body (3) comprises two casings (3', 3") contained one inside the other so as to delimit a cavity (5) between them.

17. The machine according to claim 16, wherein said cavity (5) is configured as a compressed cooling air passage.

18. The machine according to claim 15, further comprising a compressed air container (45) attached to said body (3), and connected to and/or provided with a plurality of nozzles (46) directed towards the body (3) of the machine (2) in order to allow compressed air present inside the compressed air container (45) to escape towards the the body (3).

19. The machine according to claim 18, wherein said cavity (5), said compressed air container (45) and a sheath (20) housing electrical and pneumatic ducts are provided with compressed air by a single compressor (54).

20. The machine according to claim 15, wherein:
at least one video camera (30) is positioned on the front portion of the body (3),
at least one camera (32) is positioned on the rear portion of the body (3), and
at least one video camera (34) is integral with the lance (24).

21. Method for cleaning regeneration chambers (56) of furnaces for, the production of glass articles, the regeneration chambers (56) having stacks of hollow refractory elements delimiting vertical passages, which define chimneys for combustion fumes from said furnaces, the method comprising:
providing the machine of claim 1;
using the machine to aspirate debris already present inside a lower compartment (55) of the regeneration chamber (56) to be cleaned in order to detect types of residues present on a floor thereof and their location to verify conditions of the chamber, and to diagnose any malfunctions and/or criticalities relating thereto,
using the machine to sandblast the chimneys of said regeneration chamber, and
using the machine to aspirate debris generated by said sandblasting.

* * * * *